US012083654B1

(12) United States Patent
Huang

(10) Patent No.: US 12,083,654 B1
(45) Date of Patent: Sep. 10, 2024

(54) INTERNAL MEMBER DISASSEMBLY TOOL

(71) Applicant: SHIFUKANG INDUSTRIAL.CO., LTD., Taichung (TW)

(72) Inventor: Shang-Yuan Huang, Taichung (TW)

(73) Assignee: SHIFUKANG INDUSTRIAL.CO., LTD., Taichung (TW)

( * ) Notice: Subject to any disclaimer, the term of this patent is extended or adjusted under 35 U.S.C. 154(b) by 0 days.

(21) Appl. No.: 18/400,831

(22) Filed: Dec. 29, 2023

(51) Int. Cl.
*B25B 27/02* (2006.01)

(52) U.S. Cl.
CPC .................................. *B25B 27/023* (2013.01)

(58) Field of Classification Search
CPC .................................................... B25B 27/023
See application file for complete search history.

(56) References Cited

U.S. PATENT DOCUMENTS

2019/0224822 A1* 7/2019 Yang ..................... B25B 27/023

* cited by examiner

*Primary Examiner* — Rick K Chang
(74) *Attorney, Agent, or Firm* — MUNCY, GEISSLER, OLDS & LOWE, P.C.

(57) ABSTRACT

An internal member disassembly tool is provided, wherein the internal member disassembly tool includes: a base including two side portions; a clamp assembly including a support tube, an abutting tube, a guiding pin and an elastic member, the support tube being disposed on one of the two side portions, the abutting tube being disposed on the other of the two side portions and movable in a moving direction, the abutting tube including a guiding slot, the guiding pin being disposed on the side portion and extending in the guiding slot, the elastic member being disposed between the abutting tube and the side portion, the elastic member urging the abutting tube toward the support tube; and a driving member disposed through one of the two side portions and movable in the moving direction.

10 Claims, 6 Drawing Sheets

INTERNAL MEMBER DISASSEMBLY TOOL

BACKGROUND OF THE INVENTION

Field of the Invention

The present invention relates to a disassembly tool, and more particular to an internal member disassembly tool.

Description of the Prior Art

A mechanical device generally includes relatively movable components assembled and connected to each other. For example, shafts, bearings, universal joints, connecting rods and other components are often used in transmission mechanisms. An internal member, such as a bearing, is received in another component, which is difficult to disassemble. The conventional method is to use a hammer or the like to impact them to force the internal member to disassemble.

However, this disassembly method is not only time-consuming, laborious, and extremely inefficient, but also easily damages the components and structures around the internal member.

The present invention is, therefore, arisen to obviate or at least mitigate the above-mentioned disadvantages.

SUMMARY OF THE INVENTION

The main object of the present invention is to provide an internal member disassembly tool which can push out the internal member in an effective and gentle way, so as to maintain the structural integrity of the internal member and surrounding components, and is easy to assemble, simple and fast to operate.

To achieve the above and other objects, an internal member disassembly tool is provided, wherein the internal member disassembly tool includes: a base including two side portions arranged in interval in a moving direction; a clamp assembly including a support tube, an abutting tube, a guiding pin and an elastic member, the support tube being disposed on one of the two side portions, the abutting tube being disposed on the other of the two side portions and movable in the moving direction, the abutting tube including a guiding slot extending in the moving direction, the guiding pin being disposed on the side portion and extending in the guiding slot, the elastic member being disposed between the abutting tube and the side portion, the elastic member urging the abutting tube toward the support tube so that the abutting tube and the support tube are configured to clamp a disassembled object; and a driving member disposed through one of the two side portions and movable in the moving direction to be configured to push an internal member received in the disassembled object.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
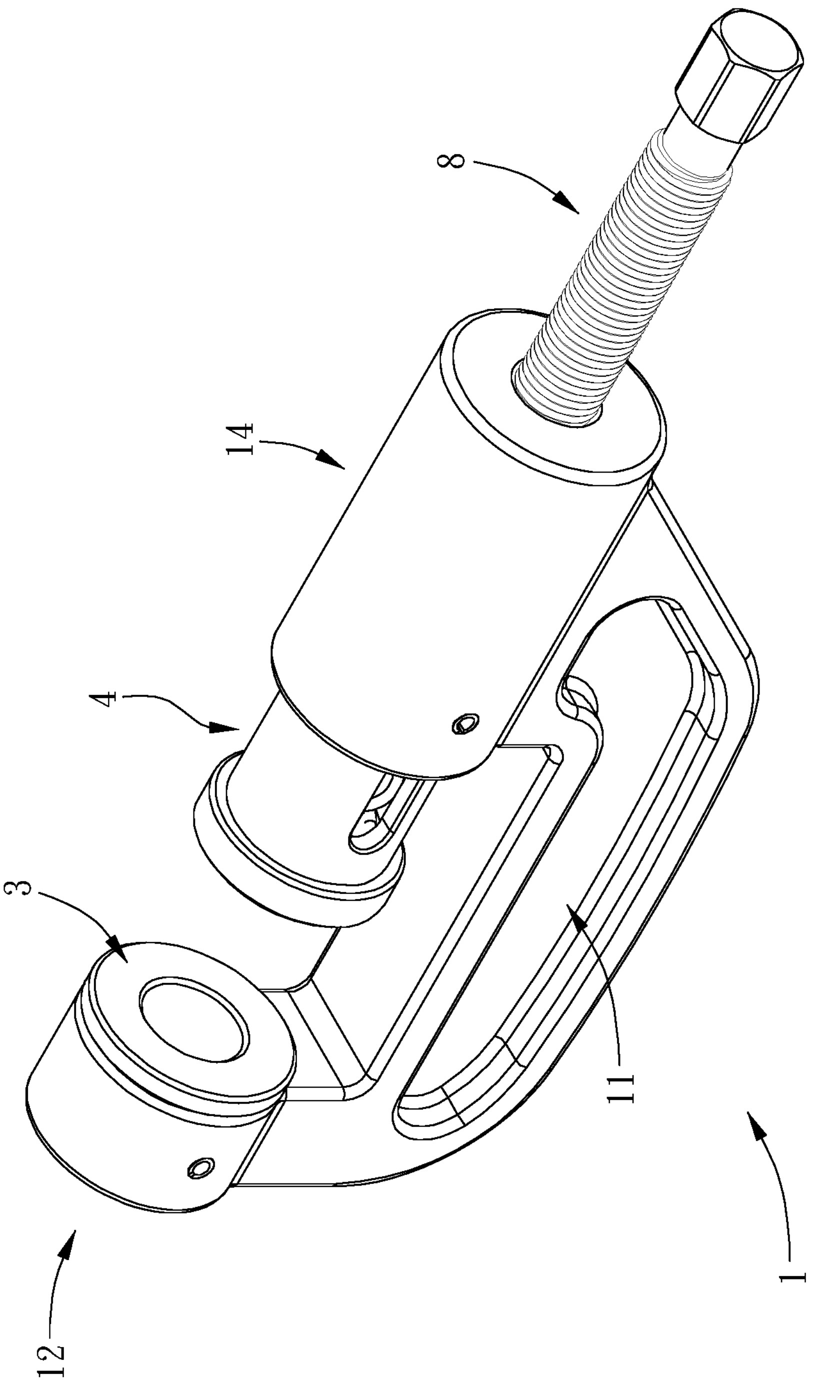
FIG. 1 is a stereogram of an exemplary embodiment of the present invention.
Figure 2:
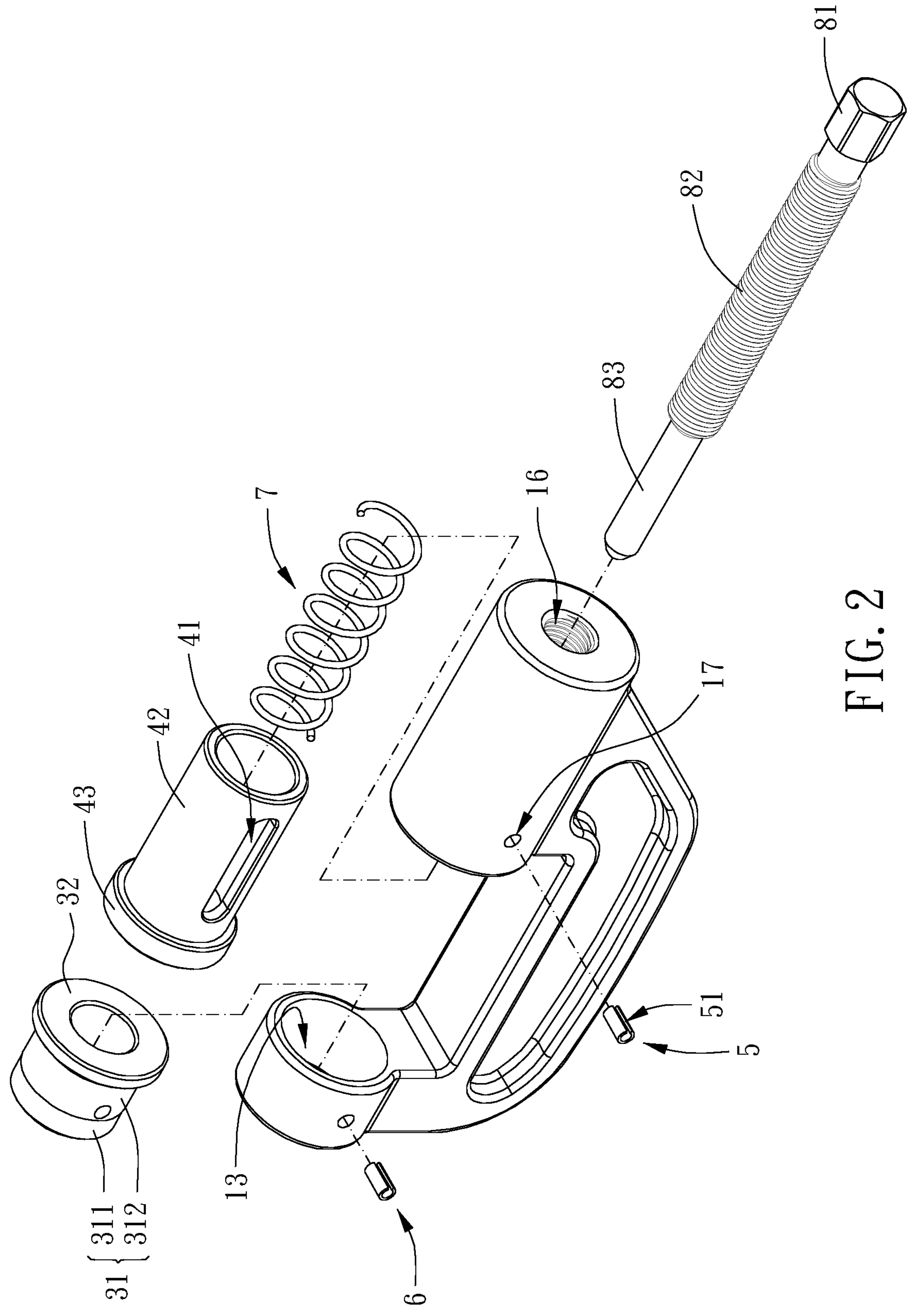
FIG. 2 is a breakdown drawing of an exemplary embodiment of the present invention.
Figure 3:
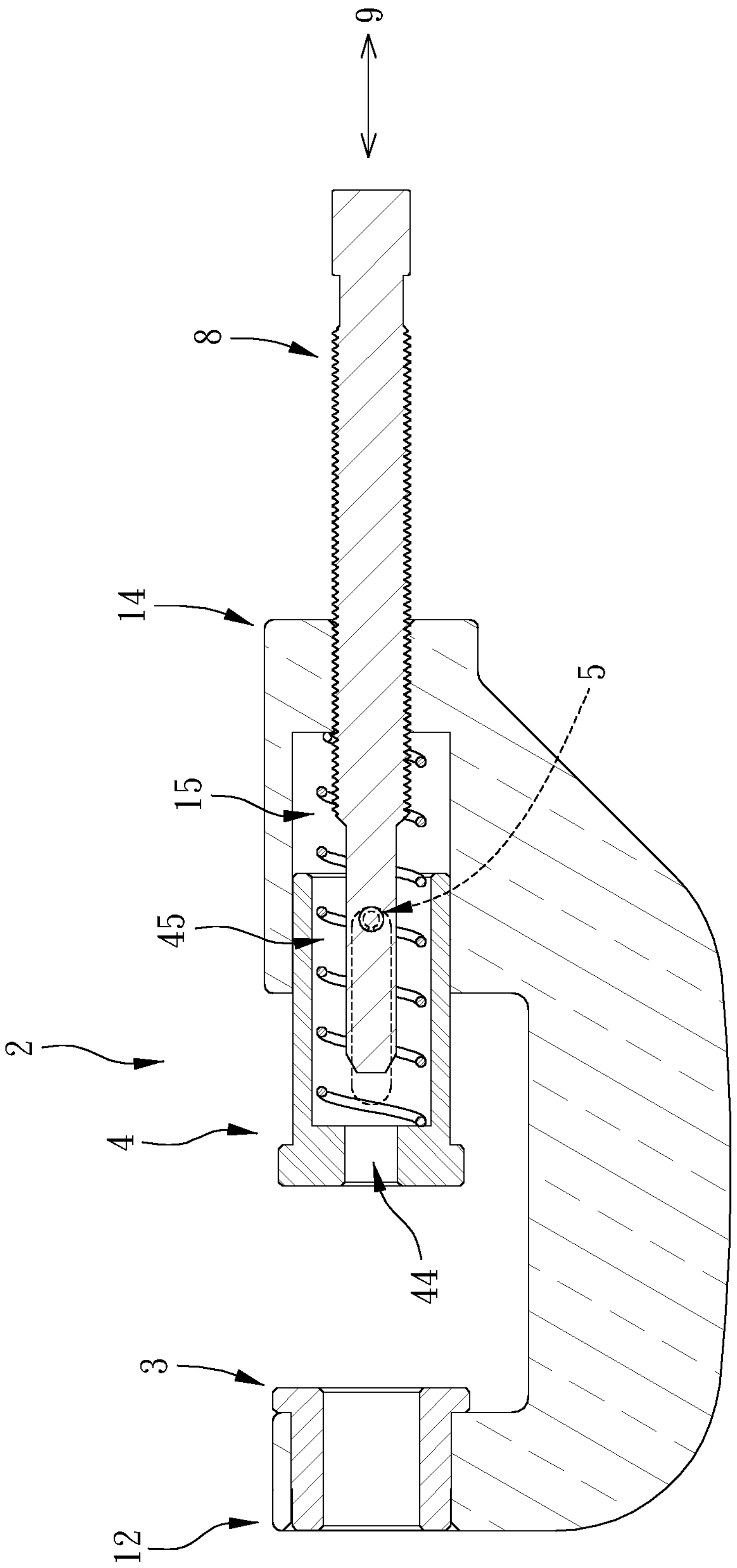
FIG. 3 is an axial cross-sectional view of an exemplary embodiment of the present invention.
Figure 4:
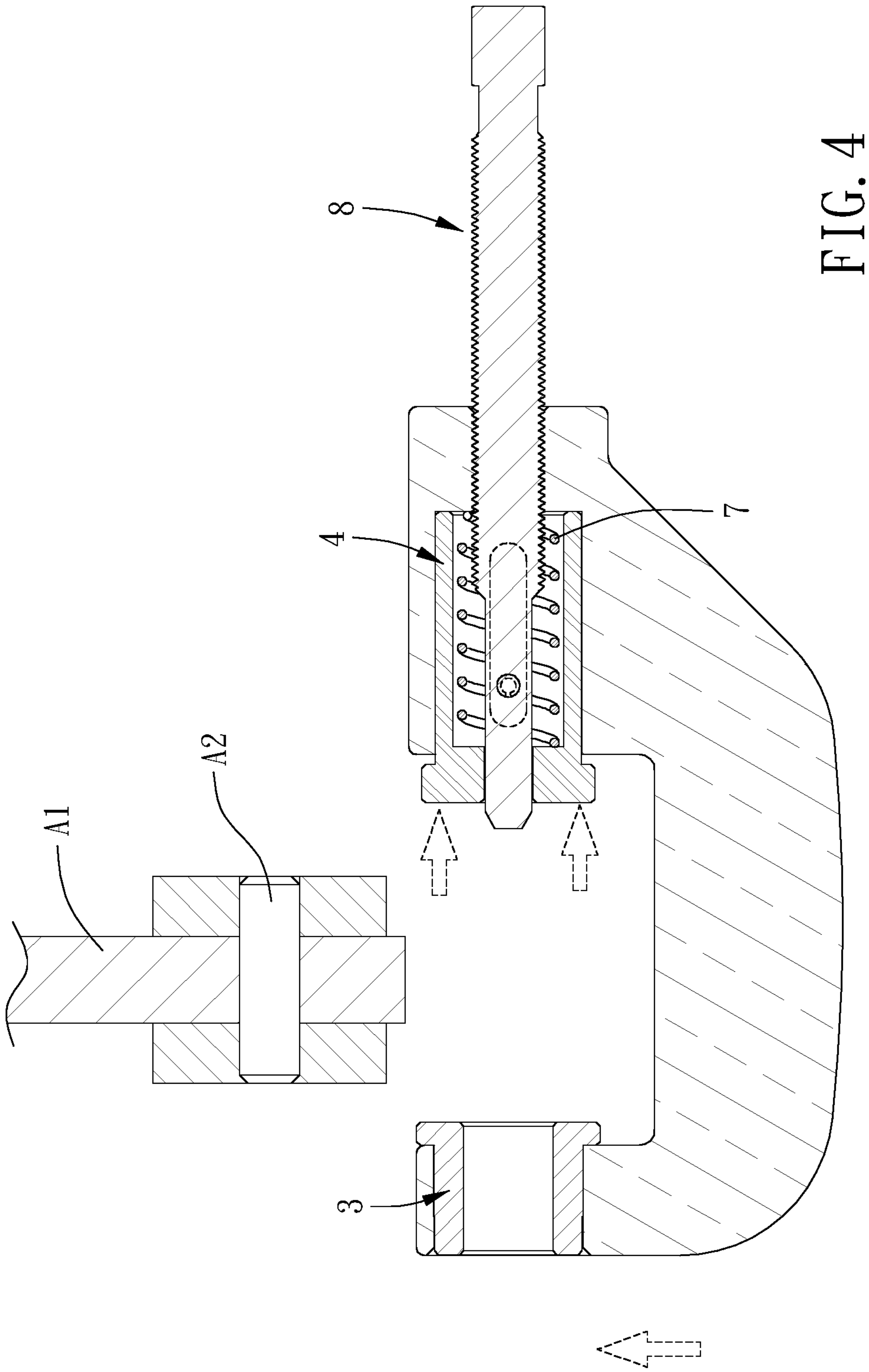
FIGS. 4 and 5 are drawings showing operation of an exemplary embodiment of the present invention.
Figure 5:
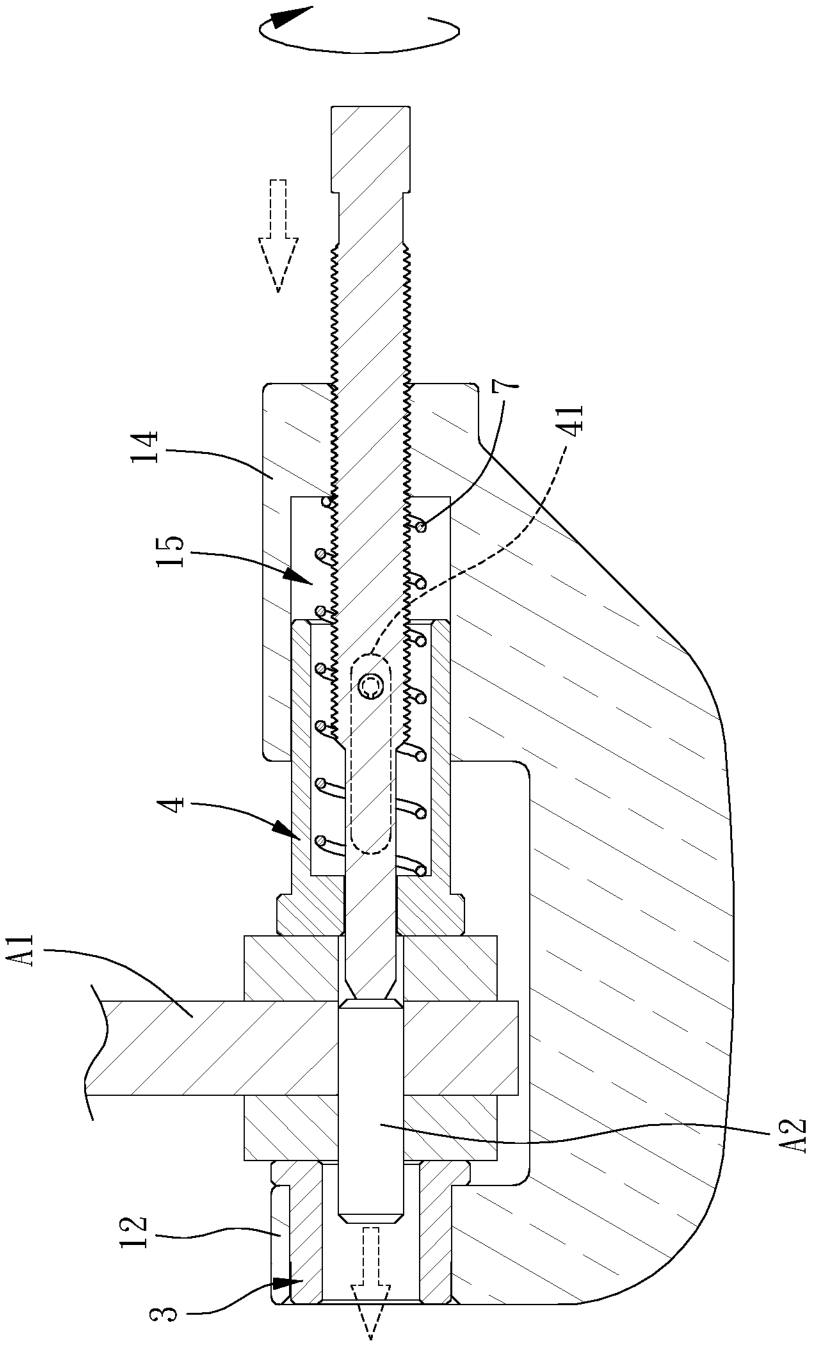
Figure 6:
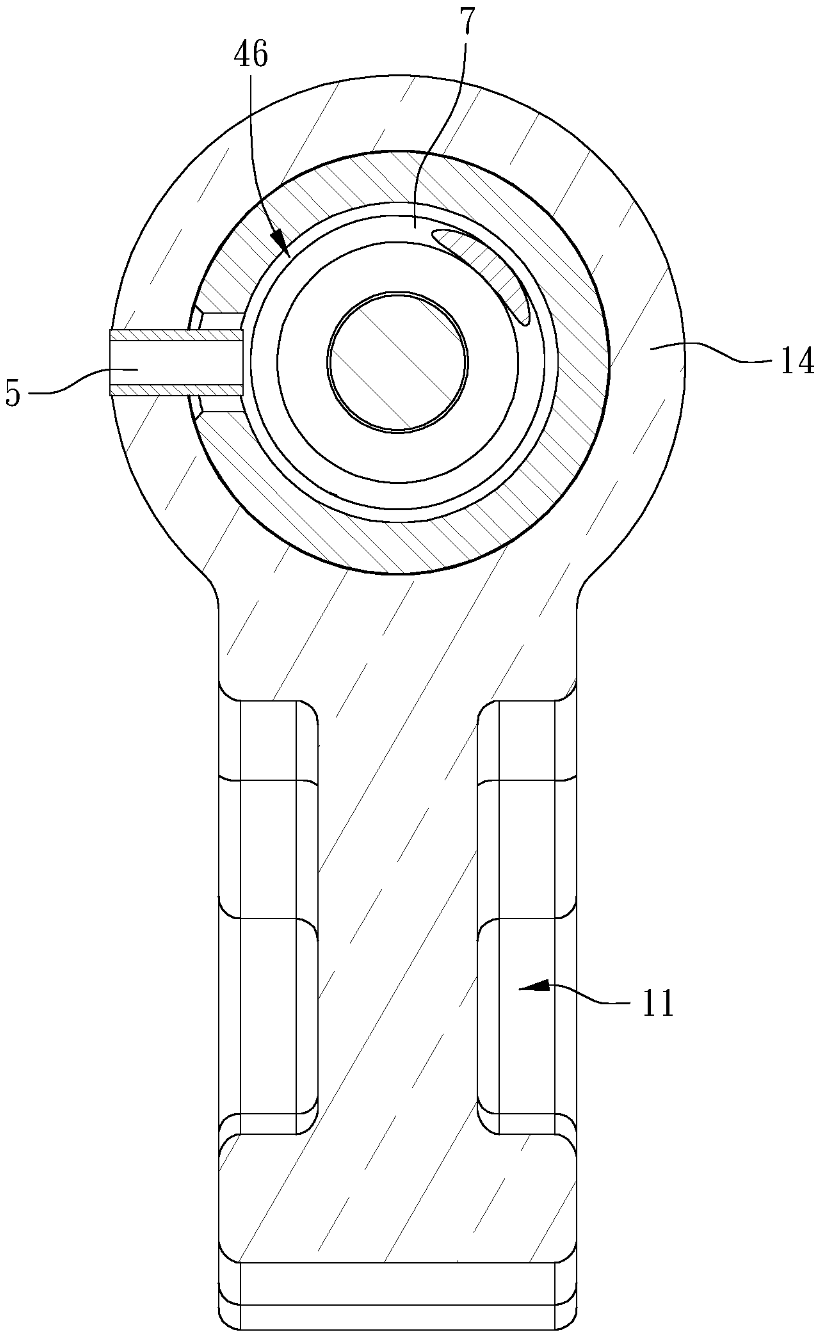
FIG. 6 is a radial cross-sectional view of an exemplary embodiment of the present invention.

Please refer to FIGS. 1 to 6 for an exemplary embodiment of the present invention. An internal member disassembly tool of the present invention includes a base 1, a clamp assembly 2 and a driving member 8.

The base 1 includes two side portions arranged in interval in a moving direction 9, and two sides of the base 1 in the direction perpendicular to the moving direction 9 each include a groove 11 extending in the moving direction 9, which facilitates fingers to reach and grip.

The clamp assembly 2 includes a support tube 3, an abutting tube 4, a guiding pin 5 and an elastic member 7, the support tube 3 is disposed on one of the two side portions, the abutting tube 4 is disposed on the other of the two side portions and movable in the moving direction 9, the abutting tube 4 includes a guiding slot 41 extending in the moving direction 9, and the guiding pin 5 is disposed on the side portion and extends in the guiding slot 41 to limit the movement range of the abutting tube 4 and prevent the abutting tube 4 form disengaging from the side portion. The elastic member 7 is disposed between the abutting tube 4 and the side portion, the elastic member 7 urges the abutting tube 4 toward the support tube 3 so that the abutting tube 4 and the support tube 3 are configured to clamp a disassembled object A1.

The driving member 8 is disposed through one of the two side portions and movable in the moving direction 9 to be configured to push an internal member A2 received in the disassembled object A1, to achieve the purpose of withdrawing the internal member A2 from the disassembled object A1.

In this embodiment, the two side portions include a first side portion 12 and a second side portion 14, the first side portion 12 includes a first assembly hole 13 disposed therethrough in the moving direction 9, the support tube 3 is inserted in the first assembly hole 13, the second side portion 14 includes a second assembly hole 15 and a threaded hole 16 which are arranged in the moving direction 9 and in communication with each other, the second assembly hole 15 is located between the first assembly hole 13 and the threaded hole 16, and the abutting tube 4 is inserted in the second assembly hole 15. The elastic member 7 is abutted against and between an inner wall of the second assembly hole 15 and the abutting tube 4, the guiding pin 5 is inserted in and positioned to the second side portion 14, and the driving member 8 is screwed to the threaded hole 16 and operable to be inserted into the second assembly hole 15 and the abutting tube 4.

Preferably, the first assembly hole 13 and the second assembly hole 15 are coaxially arranged, and a diametric dimension of the first assembly hole 13 is equal to a diametric dimension of the second assembly hole 15 so that it allows a drill to move through the first side portion 12 and into the second side portion 14 in the moving direction 9, which has advantages of simplified processing and rapid production.

The abutting tube 4 further includes a body portion 42, a bottom portion 43 and a perforation 44, the body portion 42 may be entirely received in the second assembly hole 15, the body portion 42 extends transversely from the bottom portion 43 to define an inner space 45, the inner space 45 is in communication with the second assembly hole 15, the guiding slot 41 is disposed on the body portion 42, the perforation 44 is disposed through the bottom portion 43, a diametric dimension of the perforation 44 is smaller than a diametric dimension of the support tube 3, an end of the elastic member 7 is located in the inner space 45 and abutted against the bottom portion 43, another end of the elastic member 7 is abutted against the inner wall of the second assembly hole 15, and the driving member 8 is disposed through the second assembly hole 15 and the inner space 45 in the moving direction 9 and protrusive beyond the perforation 44 for pushing the internal member A2. The driving member 8 includes a driving head 81, a threaded section 82 and an urging section 83 connected to one another in sequence, the driving head 81 has an outer contour which is non-circular, the threaded section 82 is screwed to the threaded hole 16, and the urging section 83 is disposed through the perforation 44 for pushing the internal member A2.

Preferably, the bottom portion 43 has a thickness in the moving direction 9 larger than a thickness of the body portion 42 in a direction perpendicular to the moving direction 9, to ensure that the bottom portion 43 has better structural strength to withstand the impact force generated when it abuts the disassembled object A1. A diametric dimension of the bottom portion 43 is larger than a diametric dimension of the body portion 42 so that the bottom portion 43 and the disassembled object A1 will have more contact surfaces to disperse the stress.

The guiding slot 41 is disposed through the body portion 42 and in communication with the inner space 45, the elastic member 7 is a spring, there is a gap 46 between the elastic member 7 and the body portion 42 in a radial direction of the body portion 42, the guiding pin 5 is disposed through the guiding slot 41 and extends in the gap 46, and the guiding pin 5 and the elastic member 7 do not interfere with each other in the moving direction 9. In this embodiment, the guiding pin 5 is made of metal, the guiding pin 5 is tubular, the guiding pin 5 includes a slit 51 extending axially, the slit 51 is in communication with an interior of the guiding pin 5, the second side portion 14 further includes an insertion hole 17 disposed therethrough, the insertion hole 17 extends in a direction perpendicular to the moving direction 9 and is in communication with the second assembly hole 15, the guiding pin 5 is inserted in the insertion hole 17, and the guiding pin 5 is elastically abutted radially against an inner surface of the insertion hole 17.

Preferably, a diametric dimension of the insertion hole 17 is larger than 0.5 times a width of the guiding slot 41, which ensures that the guiding pin 5 has a suitable size in the moving direction 9 and the groove walls of the guiding slot 41 are in contact with each other, can disperse stress, and can operate reliably.

Preferably, a length of the guiding pin 5 is smaller than the diametric dimension of the second assembly hole 15 so that when it is necessary to disassemble the abutting tube 4, the user can use a tool to push the guiding pin 5 directly into the second assembly hole 15, which is quick to disassemble.

Preferably, the guiding pin 5 is radially gapped from at least one of two sides of the guiding slot 41, which can reduce frictional resistance and wear during sliding, and also allows the abutting tube 4 to perform a small relative rotation to avoid jamming of parts.

Preferably, when the guiding pin 5 is located at an end of the guiding slot 41 remote from the support tube 3, a length of a portion of the abutting tube 4 which is received within the second assembly hole 15 is larger than or equal to 0.25 times a length of the second assembly hole 15 so that the inner wall of the second assembly hole 15 and the abutting tube 4 have enough contact area for support to prevent the abutting tube 4 from being too short and tilting relative to the second side portion 14.

The clamp assembly 2 further includes a positioning pin 6, the positioning pin 6 disposed on the side portion and through the support tube 3. A length of the positioning pin 6 is smaller than the diametric dimension of the first assembly hole 13, and the positioning pin 6 is identical to the guiding pin 5 and has the function the same as that of the guiding pin 5.

The support tube 3 includes a tubular body 31 and a flange 32, the flange 32 extends transversely from a side of the tubular body 31, the tubular body 31 includes a first section 311 and a second section 312, the first section 311 has an outer diametric dimension smaller than an outer diametric dimension of the second section 312, the second section includes the flange 32, and when the support tube 3 is inserted in the first assembly hole 13, the first section 311 is inserted in the first assembly hole 13 and the flange 32 is configured to be abutted against the first side portion 12. As the internal member disassembly device is used for a long time or repeatedly, the flange 32 can protect the first side portion 12 from direct contact wear of the disassembled object A1, which can effectively increase the service life of the base 1 and ensure structural integrity.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. An internal member disassembly tool including:

a base including two side portions arranged in interval in a moving direction, wherein the two side portions include a first side portion and a second side portion;

a clamp assembly including a support tube, an abutting tube, a guiding pin and an elastic member, the support tube being disposed on the first side portion, the abutting tube being disposed on the second side portion and movable in the moving direction, the abutting tube including a guiding slot extending in the moving direction, the guiding pin being disposed on the second side portion and extending in the guiding slot, the elastic member being disposed between the abutting tube and the second side portion, the elastic member urging the abutting tube toward the support tube so that the abutting tube and the support tube are configured to clamp a disassembled object; and a driving member disposed through one of the first side portion and the second side portion and movable in the moving direction to be configured to push an internal member received in the disassembled object.

2. The internal member disassembly tool of claim 1, wherein the first side portion includes a first assembly hole disposed therethrough in the moving direction, the support tube is inserted in the first assembly hole, the second side portion includes a second assembly hole and a threaded hole which are arranged in the moving direction and in communication with each other, the second assembly hole is located between the first assembly hole and the threaded hole, the abutting tube is inserted in the second assembly hole, the elastic member is abutted against and between an inner wall of the second assembly hole and the abutting tube, the guiding pin is inserted in and positioned to the second side portion, and the driving member is screwed to the threaded hole and operable to be inserted into the second assembly hole and the abutting tube.

3. The internal member disassembly tool of claim 2, wherein the abutting tube further includes a body portion, a bottom portion and a perforation, the body portion extends transversely from the bottom portion to define an inner space, the inner space is in communication with the second assembly hole, the guiding slot is disposed on the body portion, the perforation is disposed through the bottom portion, an end of the elastic member is located in the inner space and abutted against the bottom portion, another end of the elastic member is abutted against the inner wall of the second assembly hole, and the driving member is disposed through the second assembly hole and the inner space in the moving direction and protrusive beyond the perforation for pushing the internal member.

4. The internal member disassembly tool of claim 3, wherein the guiding slot is disposed through the body portion and in communication with the inner space, the elastic member is a spring, there is a gap between the elastic member and the body portion in a radial direction of the body portion, the guiding pin is disposed through the guiding slot and extends in the gap, and the guiding pin and the elastic member do not interfere with each other in the moving direction.

5. The internal member disassembly tool of claim 2, wherein when the guiding pin is located at an end of the guiding slot remote from the support tube, a length of a portion of the abutting tube which is received within the second assembly hole is larger than or equal to 0.25 times a length of the second assembly hole.

6. The internal member disassembly tool of claim 2, wherein the first assembly hole and the second assembly hole are coaxially arranged, and a diametric dimension of the first assembly hole is equal to a diametric dimension of the second assembly hole so that it allows a drill to move through the first side portion and into the second side portion in the moving direction.

7. The internal member disassembly tool of claim 2, wherein the guiding pin is tubular, the guiding pin includes a slit extending axially, the slit is in communication with an interior of the guiding pin, the second side portion further includes an insertion hole disposed therethrough, the insertion hole extends in a direction perpendicular to the moving direction and is in communication with the second assembly hole, the guiding pin is inserted in the insertion hole, and the guiding pin is elastically abutted radially against an inner surface of the insertion hole.

8. The internal member disassembly tool of claim 2, wherein the support tube includes a tubular body and a flange, the flange extends transversely from a side of the tubular body, the tubular body includes a first section and a second section, the first section has an outer diametric dimension smaller than an outer diametric dimension of the second section, the second section includes the flange, and when the support tube is inserted in the first assembly hole, the first section is inserted in the first assembly hole and the flange is configured to be abutted against the first side portion.

9. The internal member disassembly tool of claim 1, wherein the clamp assembly further includes a positioning pin disposed on the first side portion and through the support tube.

10. The internal member disassembly tool of claim 4, wherein when the guiding pin is located at an end of the guiding slot remote from the support tube, a length of a portion of the abutting tube which is received within the second assembly hole is larger than or equal to 0.25 times a length of the second assembly hole; the first assembly hole and the second assembly hole are coaxially arranged, and a diametric dimension of the first assembly hole is equal to a diametric dimension of the second assembly hole so that it allows a drill to move through the first side portion and into the second side portion in the moving direction; the support tube includes a tubular body and a flange, the flange extends transversely from a side of the tubular body, the tubular body includes a first section and a second section, the first section has an outer diametric dimension smaller than an outer diametric dimension of the second section, the second section includes the flange, and when the support tube is inserted in the first assembly hole, the first section is inserted in the first assembly hole and the flange is configured to be abutted against the first side portion; the guiding pin is tubular, the guiding pin includes a slit extending axially, the slit is in communication with an interior of the guiding pin, the second side portion further includes an insertion hole disposed therethrough, the insertion hole extends in a direction perpendicular to the moving direction and is in communication with the second assembly hole, the guiding pin is inserted in the insertion hole, and the guiding pin is elastically abutted radially against an inner surface of the insertion hole; the clamp assembly further includes a positioning pin disposed on the first side portion and through the support tube; a diametric dimension of the insertion hole is larger than 0.5 times a width of the guiding slot; the bottom portion has a thickness in the moving direction larger than a thickness of the body portion in a direction perpendicular to the moving direction; a diametric dimension of the bottom portion is larger than a diametric dimension of the body portion; two sides of the base in the direction perpendicular to the moving direction each include a groove extending in the moving direction; the driving member includes a driving head, a threaded section and an urging section connected to one another in sequence, the driving head has an outer contour which is non-circular, the threaded section is screwed to the threaded hole, and the urging section is disposed through the perforation; a length of the positioning pin is smaller than the diametric dimension of the first assembly hole; a length of the guiding pin is smaller than the diametric dimension of the second assembly hole; a diametric dimension of the perforation is smaller than a diametric dimension of the support tube; the positioning pin is identical to the guiding pin; the guiding pin is radially gapped from at least one of two sides of the guiding slot.

* * * * *